Nov. 14, 1939. K. C. D. HICKMAN 2,180,050
VACUUM DISTILLATION APPARATUS
Original Filed Sept. 5, 1936
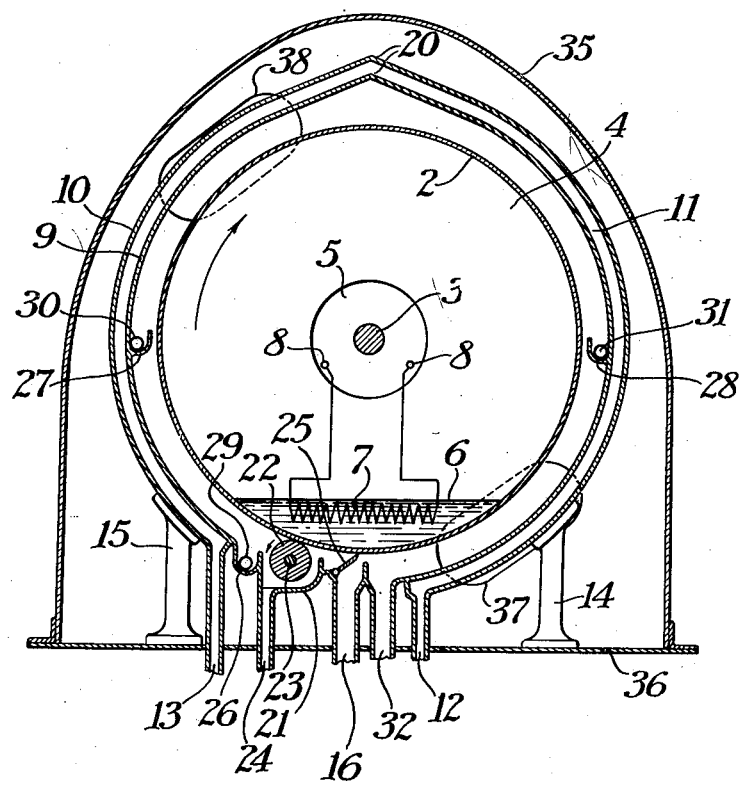
Kenneth C.D.Hickman
INVENTOR
BY
ATTORNEYS Patented Nov. 14, 1939

2,180,050

UNITED STATES PATENT OFFICE 2,180,050

VACUUM DISTILLATION APPARATUS

Kenneth C. D. Hickman, Rochester, N. Y., assignor, by mesne assignments, to Distillation Products, Inc., Rochester, N. Y., a corporation of Delaware Original application September 5, 1936, Serial No. 99,632. Divided and this application October 1, 1937, Serial No. 166,856

2 Claims. (Cl. 202—205)

This invention relates to improvements in vacuum distillation apparatus, and especially, to that variety of high vacuum evaporation apparatus known as molecular distillation apparatus.

All organic substances decompose when subjected to sufficiently high temperatures and the more unstable substances decompose at relatively low temperatures. If the temperature of distillation at atmospheric pressure is above the temperature of decomposition, it is customary to reduce the pressure and, thus, reduce the temperature of distillation. There is, however, a limit to the lowering of the temperature of distillation by reducing the pressure, this limit being reached under conditions of molecular distillation where there are no molecules of extraneous gas to interfere with the natural course of evaporation. Nothing more can be done to improve distillation from the pressure angle.

Thermal decomposition, however, is not a function of temperature only, but of temperature multiplied by time and the next improvement in distillation must come by shortening the time of exposure of the distilland. This is done in the ordinary continuous molecular still by allowing the distilland to flow in a thin stream by gravity over vertical distilling columns. Unfortunately, gravity is a fixed force and many of the substances dealt with are viscous. The time of travel under gravitational pull may be much greater than desirable.

This invention has for its object the provision of means for making the time of distillation on a given area of distilling surface shorter than can be secured by gravitational flow. For this purpose I propose to use moving surfaces, the travel of which is under control and is greater than the flow of oil would be over the same surface if held stationary. Further, I aim at controlling the thickness of the film on the moving surface so that it is much thinner than would be possible if the oil were allowed to spread naturally and fall by gravity.

The above considerations concern the fundamentals of high vacuum distillation. There are often secondary effects which may become of prime importance. These effects are produced when solids are passed through the molecular still and when dirt and solid deposits adhere to the distilling surface. By the use of rotating distilling members, coupled with knives, brushes, scrapers, and the like, liquids containing solids may be applied and removed satisfactorily. Materials which ordinarily form hard deposits on the columns are continuously scraped away and the distilling member remains bright throughout the distillation. Distillation with maximum efficiency entails complete absence of charred or porous material and it also requires a highly reflecting surface so that the loss of heat by radiation shall be at a minimum.

My invention will be readily understood from the following description and the accompanying drawing wherein I have illustrated a sectional elevation of one embodiment involving the principles of my invention.

Referring to the drawing reference number 2 designates a drum closed at one end and rigidly mounted at that end upon shaft 3. The other end of the drum is partially closed by plate 4 which is provided with a circular opening 5, concentric with shaft 3. Numeral 6 designates a body of low vapor pressure heating fluid, which is heated by a stationary electrical heating element 7 to which current is supplied by lead wires 8 projecting through opening 5. Numerals 9 and 10 designate collar-like cylinders which surround drum 2 and are substantially concentric therewith. The cylinders are welded together at the edges to form an annular space 11 through which a cooling fluid is circulated by introduction through conduit 12 and withdrawal through conduit 13. This cooling unit serves as a surface condenser and is maintained substantially concentric with evaporating drum 2 by supports 14 and 15. The top portion of cylinders 9 and 10 is shaped to a point as illustrated at 20 in order to increase the rate of removal of distillate condensing in that area.

A trough 21 traverses the length of drum 2 and has mounted within it a roll 22 which is rotated by shaft 23 and which is mounted so that the distance between its surface and that of drum 2 can be adjusted. Liquid to be distilled is introduced into trough 21 through conduit 24. An adjustable, knife like scraper blade 25 is mounted in contact with the surface of drum 2 and serves to remove undistilled residue and solids which drop or flow into conduit 16 and are withdrawn from the still. A plurality of gutters 26, 27 and 28 traverse the inside surface of cylinder 9 and serve to collect condensate flowing down the condensing walls and deliver it to conduits 29, 30 and 31 through which it is withdrawn from the still. A conduit 32 serves to remove the last fraction distilling after the surface of the drum 2 has passed gutter 28. An arch shaped cover 35 constructed to withstand the external pressure is mounted over the entire assembly and is sealed to base 36 to prevent entry of gas. The interior space including that inside drum 2 and that between drum 2 and condensing element 9 is evacuated by pumps (not shown) connected to conduits 37 and 38 which are mounted in the end plate 39 of the cover 35.

In operating the apparatus the pumps connected to conduits 37 and 38 are started and the system evacuated. The heating fluid 6 is brought to elevated temperature by current passed through heater 7 and the drum 2 is caused to rotate in the direction indicated by the arrow. The entire surface of 2 is thus heated to distillation temperature, as it passes into contact with the hot fluid at the bottom of the drum. Cooling fluid is introduced into space 11 through conduit 13 and is withdrawn through 12. Material to be distilled is then passed at a predetermined rate into trough 21 and roll 23 is caused to rotate in the direction indicated. The distance between roll 23 and drum 2 is adjusted so that a bead of the liquid to be distilled forms between them. The distilland is thus picked up and spread in a thin film upon the surface of drum 2 and is carried around through the still where complete evaporation of a desired fraction or fractions takes place. Evaporated molecules leaving the heated surface of 2 are condensed on the internal walls of 9. The condensate flows downward into gutters 26, 27 and 28 and is removed through conduits 29, 30, 31 and 32. Undistilled material is removed from the surface of the drum by scraper 25 and is withdrawn through conduit 16.

The speed of rotation of roll 22 and drum 2 can be changed to give a film of varying thickness. If roll 22 is $\frac{1}{10}$ the diameter of drum 2 and they both rotate at the same rate, the liquid on the surface of roll 22 will be spread over a ten fold area on the drum 2 and therefore will be $\frac{1}{10}$ as thick. By doubling the speed of drum 2 the film will be $\frac{1}{20}$ as thick and so forth. The distance between the rolls is preferably small, although it can be greater, but should in any case be close enough to maintain a bead of liquid during rotation. It will readily be seen that the film is thus of much greater thinness and the speed of distillation is greater than where the film thickness is determined by gravity as in processes where the liquid flows down a vertical distilling column or a distilling drum dips into a body of the liquid to be distilled.

It is apparent that many widely different variations of the illustrated apparatus can be used without departing from the spirit or scope of my invention. For instance, instead of applying distilland to the drum by means of a roll, it can be applied by a spray or brush or by means of a plain knife edge generally known as a doctor blade. Another method of application is to wipe the distilland on the drum by means of a wick which dips into a body of distilland and rubs against the surface of the drum. Instead of having an individual cover for each distillation unit, a plurality of units may be housed under a single cover. This procedure would materially reduce the amount of pumping required and minimize pumping problems. The condensing surface can also be caused to rotate. This would be of advantage when solid condensate is obtained since the rotating condensing surface could be provided with a scraper blade. Equivalents such as endless bands can be used instead of a drum or cylinder.

The use of the scraper makes possible the distillation of materials containing, or tending to deposit, solids. Solids deposited on the drum surface are continuously removed and prevented from interfering with the action of the evaporating surface. This is a decided advantage since impure mixtures containing proteins, mucilaginous materials, etc., can be distilled without purification and without interfering with the distillation. If solids removed are large in quantity and will not flow away in the residual undistilled liquid they can be forced out by a screw conveyor or similar means.

The heating fluid employed to heat the revolving drum must have a sufficiently low vapor pressure at the temperature at which it is used that it will not give off vapors resulting in destruction of the vacuum or contamination of the distillate and distilland. The selection of materials for this purpose obviously depends upon the degree of vacuum used and the temperature to which they are heated while in the still. For high vacuum distillation such as for instance at pressures below about .1 mm. materials such as vegetable and animal oils, non-volatile hydrocarbon fractions, phthalic acid esters, molten tin, low-melting bismuth alloys, etc., may be used. When high temperatures are employed and difficultly volatilizable materials such as animal and vegetable oils are distilled, the heating fluid must have a very low vapor pressure. Suitable fluids for this purpose are the undistilled residue of a vegetable or animal oil which has been distilled under molecular conditions, higher boiling petroleum fractions, lower vapor pressure phthalates, and low melting metals and alloys, etc. Heating of the drum can of course be accomplished in other ways than by a contact liquid heat transfer agent. For instance, a radiant heater may be mounted inside the drum and in close proximity thereto. The heater may heat only a portion of the drum with each revolution as with the liquid agent illustrated, or the entire drum may be heated at once. The radiant heater can be heated internally with combustible gases or hot vapors, but electricity is preferred.

The principles of my invention are applicable to processes of vacuum distillation in general, and particularly to high vacuum-short path distillation. By high vacuum is meant any pressure below approximately .1 mm. such as, for instance, .01 mm. to .0001 mm. Short path distillation is that type of distillation in which the condensing and evaporating surfaces are located in close proximity and an unconstricted path for the travel of vapors from one surface to another is provided. When the pressure is low and the distance of separation is less than about the mean free path of the molecules of residual gas the distillation is a variety of short path distillation known as molecular distillation. Lowest pressures obtainable give best results, but due to difficulties in producing and maintaining such pressures, they are not used commercially. Pressures of less than about .1 mm. such as .01 mm. to .001 mm. are generally used for molecular or pseudo molecular distillation, i. e., where the conditions closely approach but are not actually molecular. Distances of less than 12 inches between the evaporating and condensing surfaces and preferably less than 6 inches, such as ½ to 3 inches give best results in all of the above types of short path distillations. For a more complete disclosure of the principles of molecular distillation reference is made to my U. S. Patents 1,925,559 and 1,942,858 and to publications by Washburn, "Bur. St. Jour. Res." 2 (1929) 476–483 and by Burch "Pro. Royal Soc." 123A (1929) 271.

Substances which are normally solid can be distilled by applying them to the rotating surface after melting or by dissolving or dispersing them in a low vapor pressure liquid solvent.

This application is a division of my application #99,632 filed Sept. 5, 1936.

What I claim is:

1. High vacuum distillation apparatus which comprises in combination within a closed system a cylindrical, rotatable evaporating surface, an approximately cylindrical, positively cooled, condensing surface located in close proximity thereto and approximately co-axial therewith, means for withdrawing liquid from the condensing surface without admixture with distilland, means for heating to distillation temperature and rotating the evaporating surface, means for maintaining a high vacuum in the space between the evaporating and condensing surfaces, a mechanical applicator capable of applying liquid to be distilled onto the evaporating surface in a substantially thinner film than would result if the rotating surface were partially immersed in the liquid and a scraper in close relation with the evaporating surface for removing undistilled residue therefrom.

2. High vacuum distillation apparatus which comprises in combination within a closed system, a cylindrical, rotatable evaporating surface, an approximately cylindrical, positively cooled, condensing surface located in close proximity thereto and approximately co-axial therewith, means for withdrawing liquid from the condensing surface without admixture with distilland, means for heating to distillation temperature and rotating the evaporating surface, means for maintaining a high vacuum in the space between the evaporating and condensing surfaces, a roll applicator in close proximity to the evaporating surface whose axis is approximately parallel thereto and which is adapted to be rotated independently of the evaporating surface, means for supplying liquid which is to be distilled to the roll applicator, means for rotating the roll applicator and means for removing undistilled residue from the evaporating surface.

KENNETH C. D. HICKMAN.